United States Patent
Kuwabara

(10) Patent No.: US 7,657,112 B2
(45) Date of Patent: Feb. 2, 2010

(54) METHOD, APPARATUS, AND PROGRAM FOR IMAGE PROCESSING

(75) Inventor: Takao Kuwabara, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 531 days.

(21) Appl. No.: 10/934,688

(22) Filed: Sep. 7, 2004

(65) Prior Publication Data
US 2005/0053306 A1   Mar. 10, 2005

(30) Foreign Application Priority Data
Sep. 8, 2003   (JP) ............................... 2003-315677

(51) Int. Cl.
*G06K 9/40* (2006.01)
(52) U.S. Cl. .................. 382/260; 382/254; 382/264
(58) Field of Classification Search ................. 382/254, 382/260–274, 132, 275
See application file for complete search history.

(56) References Cited

U.S. PATENT DOCUMENTS

| | | | |
|---|---|---|---|
| 5,068,909 A | | 11/1991 | Rutherford et al. |
| 5,181,118 A | | 1/1993 | Kimura |
| 5,561,724 A | | 10/1996 | Kido et al. |
| 5,666,434 A | * | 9/1997 | Nishikawa et al. ........... 382/128 |
| 5,903,680 A | * | 5/1999 | De Haan et al. ............. 382/265 |
| 6,614,918 B1 | | 9/2003 | Fujita |
| 2002/0181791 A1 | * | 12/2002 | Kuniba ....................... 382/239 |
| 2003/0091243 A1 | * | 5/2003 | Sasada ....................... 382/260 |

FOREIGN PATENT DOCUMENTS

| | | |
|---|---|---|
| EP | 0 401 077 A2 | 12/1990 |
| EP | 0 447 871 A2 | 9/1991 |
| JP | 02-094962 | 4/1990 |
| JP | 2000-36033 A | 2/2000 |

OTHER PUBLICATIONS

European Search Report dated Jun. 13, 2007.

* cited by examiner

*Primary Examiner*—Charles Kim
*Assistant Examiner*—John W Lee
(74) *Attorney, Agent, or Firm*—Sughrue Mion, PLLC

(57) ABSTRACT

Generation of ringing components during extraction of striped blue components from an image is suppressed, in an image processing apparatus for removing striped blur components from the image. A preprocess is executed on an image data set, which is obtained by detecting light with line sensors that perform scanning in a sub scanning direction. The preprocess reduces drastic changes in pixel values in a first direction, which is perpendicular to the sub scanning direction. A filter process is executed on the preprocessed image data set to extract image data that represents striped blur components that extend in the sub scanning direction. The extracted image data is subtracted from the image data set to remove striped blur components.

5 Claims, 11 Drawing Sheets

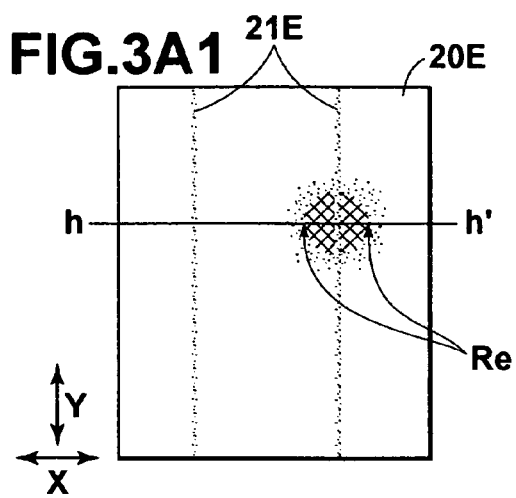
FIG.3A1
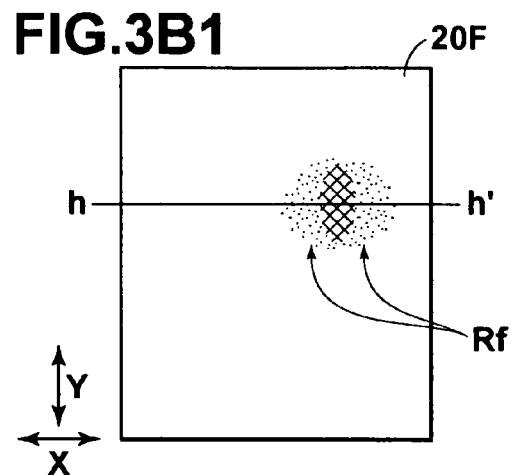
FIG.3B1
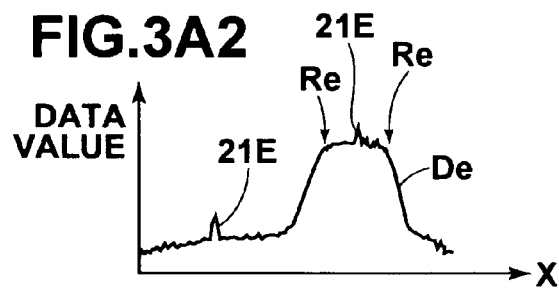
FIG.3A2
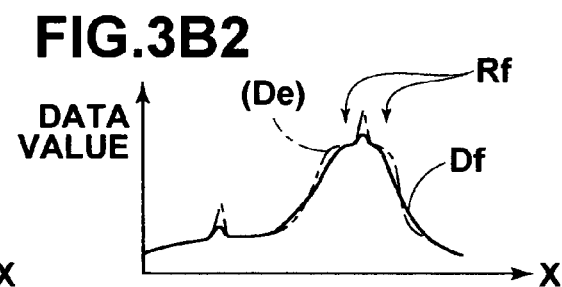
FIG.3B2
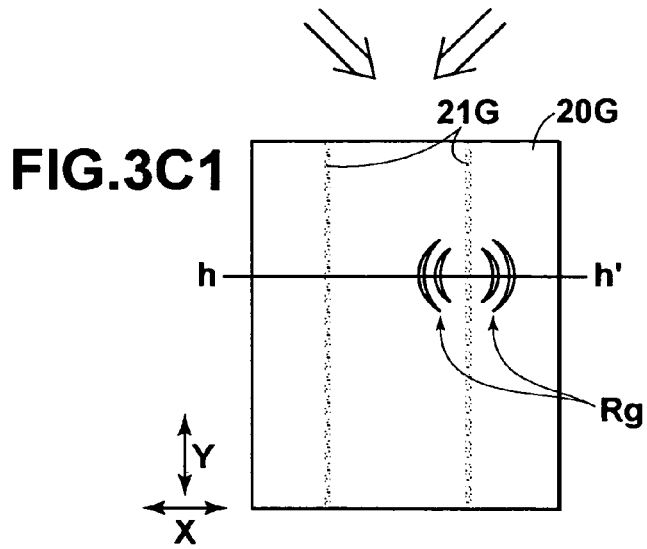
FIG.3C1
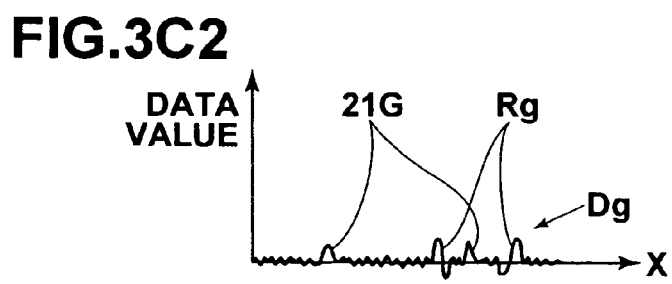
FIG.3C2

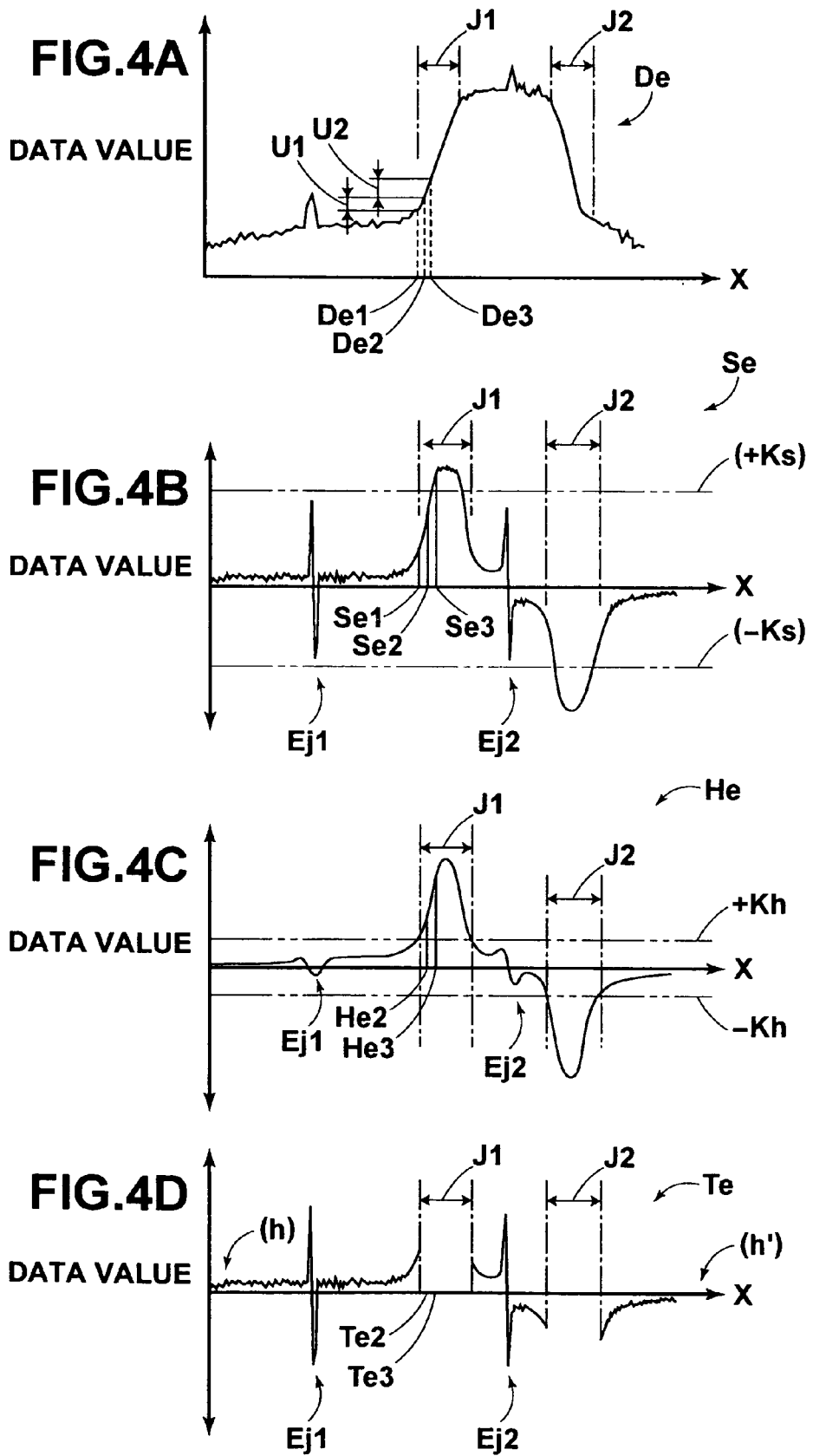

FIG.6A1
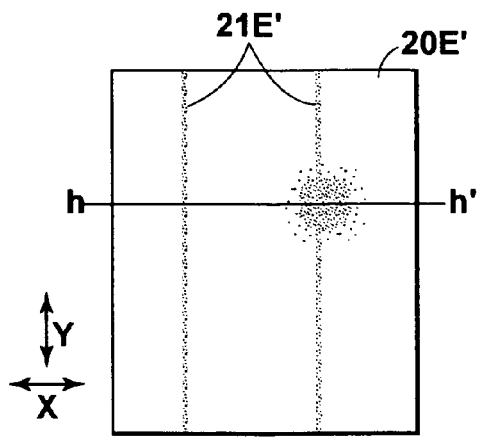
FIG.6B1
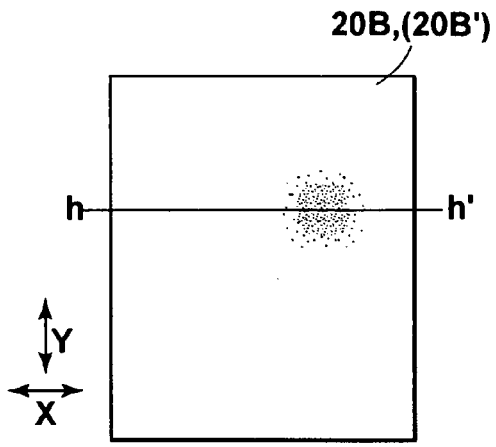
FIG.6A2
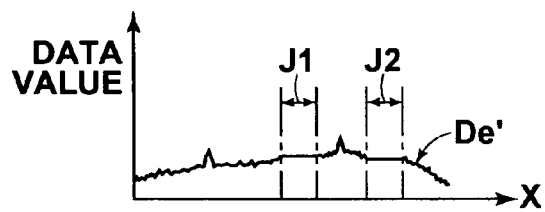
FIG.6B2
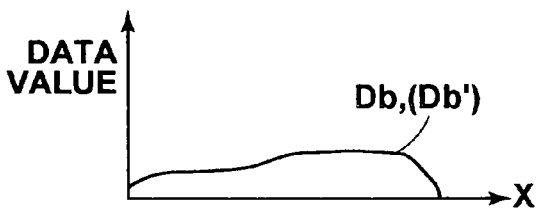
FIG.6C1
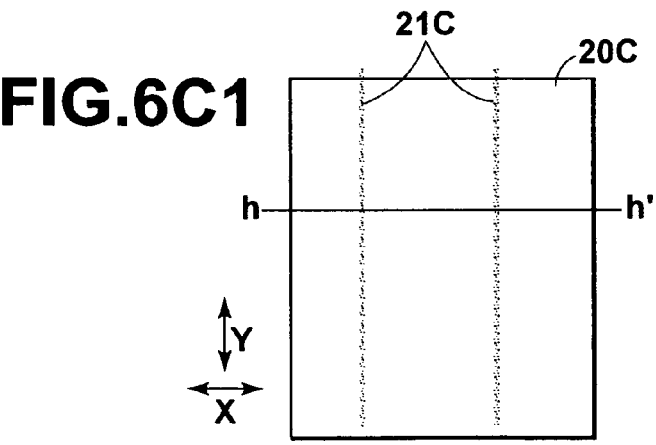
FIG.6C2
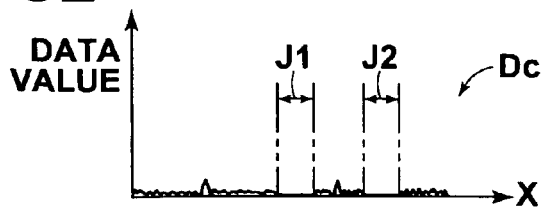

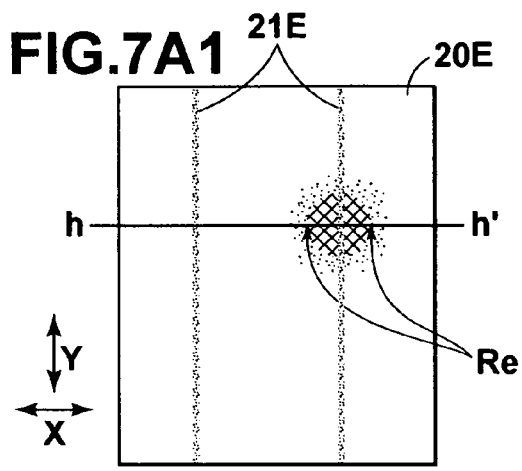
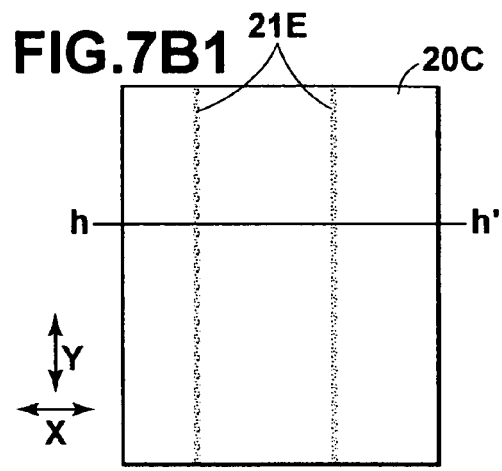
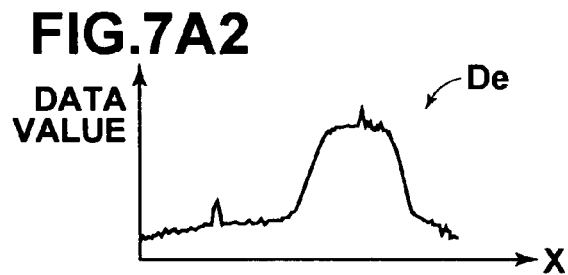
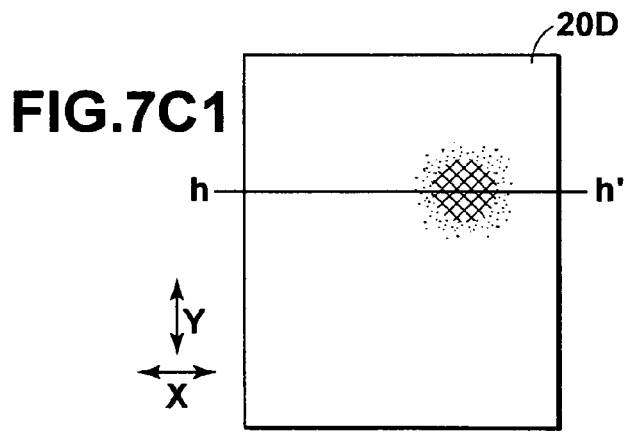
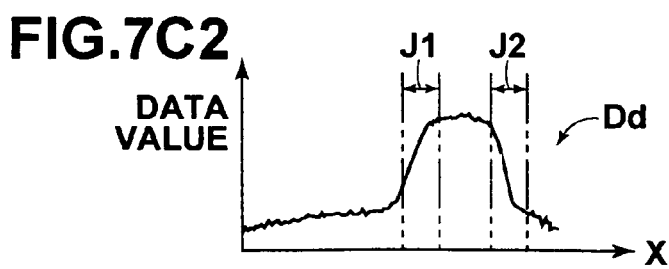

METHOD, APPARATUS, AND PROGRAM FOR IMAGE PROCESSING

BACKGROUND OF THE INVENTION

1. Field of the Invention

The present invention relates to a method, apparatus, and program for processing images. More specifically, the present invention relates to a method, apparatus, and program for removing line noise components from within images.

2. Description of the Related Art

There are known apparatuses for obtaining image data that represents an image borne by an image carrier. These apparatuses comprise line sensors, which are photoelectric conversion element arrays in which a great number of photoreceptors are arranged in a main scanning direction. Originals, which are image carriers, are relatively moved with respect to the line sensors in a sub scanning direction, which intersects with the main scanning direction. The line sensors detect light emitted from the originals, to obtain the image data that represents the image borne thereby. There are cases in which line noise components (hereinafter, also referred to as "striped blurs") that extend in the sub scanning direction are present in the image data obtained by this type of apparatus. The noise components are generated due to differences in the properties of each of the photoreceptors that constitute the line sensors. Examples of these properties are gain and temperature properties. In addition, there are cases in which striped blurs that extend in the main scanning direction are present in the image data. These striped blurs are generated by impact shock, which is applied to the line sensors. Therefore, U.S. Patent Laid-Open No. 20030091243 proposes a method, in which image data that represents an image including the striped blur is passed through a filter to extract the striped blur component; and the image data that represents the striped blur component is subtracted from the image data that represents the entirety of the image.

However, there are cases in which there are regions of an image, in which pixel values of the image data that include the striped blur component change drastically. If the above method is applied to these cases, ringing components are generated in the vicinity of these regions during extraction of the striped blur components by filtering the image data. As a result, the ringing components appear as striped blurs in the image, which has been processed to remove the striped blurs. In addition, there is a demand for a process in which linear image information components and striped blurs within an image are separated, and only the striped blurs are removed.

SUMMARY OF THE INVENTION

The present invention has been developed in view of the circumstances described above. It is the first object of the present invention to provide a method, apparatus, and program that improves the quality of an image, from which striped blur components have been removed, by suppressing ringing components from being generated during extraction of the striped blurs. The second object of the present invention is to provide a method, apparatus, and program that suppresses the loss of linear image information components during removal of striped blurs from an image.

The first image processing method of the present invention comprises the steps of:

executing a filter process on an image data set, to extract a line noise component that extends in a first direction within an image represented by the image data set; and subtracting image data that represents the line noise component from the image data set, to remove the line noise component from the image; wherein:

a preprocess, for reducing drastic changes in pixel values of the image data set in a second direction perpendicular to the first direction, is executed on the image data set prior to the filter process.

The second image processing method of the present invention comprises the steps of:

obtaining an image data set that represents an image borne by an image carrier, by relatively moving the image carrier in a sub scanning direction with respect to a photoelectric conversion element array that comprises a great number of photoreceptors arranged in a main scanning direction, which intersects with the sub scanning direction, while detecting light emitted by the image carrier with the photoreceptors;

executing a filter process on the image data set, to extract a line noise component that extends in the sub scanning direction and/or the main scanning direction within the image represented by the image data set; and subtracting image data that represents the line noise component from the image data set, to remove the line noise component from the image; wherein:

a preprocess, for reducing drastic changes in pixel values of the image data set in a first direction perpendicular to the sub scanning direction and/or a second direction perpendicular to the main scanning direction, is executed on the image data set prior to the filter process.

The first image processing apparatus of the present invention is an image processing apparatus for processing an image data set that represents an image borne by an image carrier, obtained by relatively moving the image carrier in a sub scanning direction with respect to a photoelectric conversion element array that comprises a great number of photoreceptors arranged in a main scanning direction, which intersects with the sub scanning direction, while detecting light emitted by the image carrier with the photoreceptors, comprising:

a line noise extracting means for executing a filter process on the image data set, to extract a line noise component that extends in the sub scanning direction and/or the main scanning direction within the image represented by the image data set;

a subtracting means for subtracting image data that represents the line noise component from the image data set, to remove the line noise component from the image; and a preprocessing means for executing a preprocess that reduces drastic changes in pixel values of the image data set in a first direction perpendicular to the sub scanning direction and/or a second direction perpendicular to the main scanning direction, on the image data set prior to the administration of the filter process by the line noise extracting means.

In the case that the preprocess is that which reduces drastic changes in pixel values of the image data set in the first direction, the preprocess may comprise the steps of:

obtaining difference data that represents the difference between pixel data, which are adjacent in the first direction;

executing a processes that decreases the absolute value of the difference data having values that exceed a predetermined threshold value; and cumulatively adding the processed difference data in the first direction.

Alternatively, the preprocess may comprise the steps of:

obtaining difference data that represents the difference between pixel data, which are adjacent in the first direction;

executing a filtering process on the difference data in the first direction;

executing a process that decreases the absolute value of the filter processed difference data having values that exceed a predetermined threshold value; and cumulatively adding the processed difference data in the first direction.

In the case that the preprocess is that which reduces drastic changes in pixel values of the image data set in the second direction, the preprocess may comprise the steps of:

obtaining difference data that represents the difference between pixel data, which are adjacent in the second direction;

executing a process that decreases the absolute value of the difference data having values that exceed a predetermined threshold value; and cumulatively adding the processed difference data in the second direction.

Alternatively, the preprocess may comprise the steps of:

obtaining difference data that represents the difference between pixel data, which are adjacent in the second direction;

executing a filtering process on the difference data in the second direction;

executing a process that decreases the absolute value of the filter processed difference data having values that exceed a predetermined threshold value; and cumulatively adding the processed difference data in the second direction.

The first image processing program of the present invention is a program that causes a computer to execute an image processing method for processing an image data set that represents an image borne by an image carrier, obtained by relatively moving the image carrier in a sub scanning direction with respect to a photoelectric conversion element array that comprises a great number of photoreceptors arranged in a main scanning direction, which intersects with the sub scanning direction, while detecting light emitted by the image carrier with the photoreceptors, comprising the procedures of:

executing a filter process on the image data set, to extract a line noise component that extends in the sub scanning direction and/or the main scanning direction within the image represented by the image data set; and subtracting image data that represents the line noise component from the image data set, to remove the line noise component from the image; wherein:

a preprocess, for reducing drastic changes in pixel values of the image data set in a first direction perpendicular to the sub scanning direction and/or a second direction perpendicular to the main scanning direction, is executed on the image data set prior to the filter process.

Note that the in the case that the line noise components to be removed are those that extend in the sub scanning direction, the preprocess is that which reduces drastic changes in pixel values in the first direction. In the case that the line noise components to be removed are those that extend in the main scanning direction, the preprocess is that which reduces drastic changes in pixel values in the second direction.

"Reducing drastic changes in pixel values" refers to reducing drastic changes in pixel values of the image data without losing the line noise components therein, while suppressing the generation of ringing components during processing to extract the line noise components.

The "process that decreases the absolute value of the difference data" is that which reduces the absolute values of pixel data that represents the differences between adjacent pixels, in order to suppress the generation of ringing components during processing to extract the line noise components.

"Cumulatively adding the processed difference data" refers to cumulatively adding the processed pixel data that represents the differences between adjacent pixels, so that the image is reproducible by the difference data.

The "predetermined threshold" is determined so as to separate image data that represent regions in which ringing components are generated to a large degree during processing to extract the line noise components, and image data that represent other regions.

"Values that exceed a predetermined threshold value" refer to values which are smaller than the threshold value in the case that the threshold value is a negative value, and to values which are greater than the threshold value in the case that the threshold value is a positive value. Note that it is desirable to determine both a positive threshold value and a negative threshold value.

The "filtering process" may be a process that calculates running averages of the difference data.

The third image processing method of the present invention is an image processing method for processing an image data set that represents an image borne by an image carrier, obtained by relatively moving the image carrier in a sub scanning direction with respect to a photoelectric conversion element array that comprises a great number of photoreceptors arranged in a main scanning direction, which intersects with the sub scanning direction, while detecting light emitted by the image carrier with the photoreceptors, comprising the steps of:

executing a filter process on the image data set, to extract a line noise component that extends in the sub scanning direction and/or the main scanning direction within the image represented by the image data set;

executing a process that reduces the absolute values of pixel data of image data that represents the line noise component as a whole; and subtracting the processed image data that represents the line noise component from the image data set, to remove the line noise component from the image.

The second image processing apparatus of the present invention is an image processing apparatus for processing an image data set that represents an image borne by an image carrier, obtained by relatively moving the image carrier in a sub scanning direction with respect to a photoelectric conversion element array that comprises a great number of photoreceptors arranged in a main scanning direction, which intersects with the sub scanning direction, while detecting light emitted by the image carrier with the photoreceptors, comprising:

a line noise extracting means for executing a filter process on the image data set, to extract a line noise component that extends in the sub scanning direction and/or the main scanning direction within the image represented by the image data set;

a data converting means for reducing the absolute values of pixel data of image data that represents the line noise component as a whole; and a subtracting means for subtracting image data that represents the line noise component from the image data set, to remove the line noise component from the image.

The second program of the present invention is a program that causes a computer to execute an image processing method for processing an image data set that represents an image borne by an image carrier, obtained by relatively moving the image carrier in a sub scanning direction with respect to a photoelectric conversion element array that comprises a great number of photoreceptors arranged in a main scanning direction, which intersects with the sub scanning direction, while detecting light emitted by the image carrier with the photoreceptors, comprising the procedures of:

executing a filter process on the image data set, to extract a line noise component that extends in the sub scanning direction and/or the main scanning direction within the image represented by the image data set;

executing a process that reduces the absolute values of pixel data of image data that represents the line noise component as a whole; and subtracting the processed image data that represents the line noise component from the image data set, to remove the line noise component from the image.

To "reduce the absolute values of pixel data . . . as a whole" refers to reducing the absolute values of the pixel data as a whole, while maintaining the magnitude relationships among the pixel values of each pixel.

The photoelectric conversion element array may be a one dimensional line sensor comprising a great number of photoreceptors, which are arranged linearly. Alternatively, the photoelectric conversion element array may be a two dimensional area sensor comprising a plurality of rows of a great number of photoreceptors, which are arranged linearly.

The first image processing method of the present invention comprises the steps of:

executing a filter process on an image data set, to extract a line noise component that extends in a first direction within an image represented by the image data set; and subtracting image data that represents the line noise component from the image data set, to remove the line noise component from the image; wherein:

a preprocess, for reducing drastic changes in pixel values of the image data set in a second direction perpendicular to the first direction, is executed on the image data set prior to the filter process. Thereby, the image data that represents striped blur components, which are line noise components, can be extracted while suppressing the generation of ringing components during the extraction process. Accordingly, inclusion of the ringing components in an image, from which striped blur components have been removed, is suppressed, therefore the quality of the image can be improved. At the same time, loss of linear image information components associated with removal of striped blur components can also be suppressed.

According to the second image processing method, the first image processing apparatus, and the first program of the present invention, an image data set that represents an image borne by an image carrier, obtained by relatively moving the image carrier in a sub scanning direction with respect to a photoelectric conversion element array that comprises a great number of photoreceptors arranged in a main scanning direction, which intersects with the sub scanning direction, while detecting light emitted by the image carrier with the photoreceptors, is processed by:

executing a filter process on the image data set, to extract a line noise component that extends in the sub scanning direction and/or the main scanning direction within the image represented by the image data set; and subtracting image data that represents the line noise component from the image data set, to remove the line noise component from the image; wherein:

a preprocess, for reducing drastic changes in pixel values of the image data set in a first direction perpendicular to the sub scanning direction and/or a second direction perpendicular to the main scanning direction, is executed on the image data set prior to the filter process. Thereby, the image data that represents striped blur components, which are line noise components, can be extracted while suppressing the generation of ringing components during the extraction process. Accordingly, inclusion of the ringing components in an image, from which striped blur components have been removed, is suppressed, therefore the quality of the image can be improved. At the same time, loss of linear image information components associated with removal of striped blur components can also be suppressed.

In the case that the preprocess is that which reduces drastic changes in pixel values of the image data set in the first direction, the preprocess may comprise the steps of:

obtaining difference data that represents the difference between pixel data, which are adjacent in the first direction;

executing a processes that decreases the absolute value of the difference data having values that exceed a predetermined threshold value; and cumulatively adding the processed difference data in the first direction.

Alternatively, the preprocess may comprise the steps of:

obtaining difference data that represents the difference between pixel data, which are adjacent in the first direction;

executing a filtering process on the difference data in the first direction;

executing a process that decreases the absolute value of the filter processed difference data having values that exceed a predetermined threshold value; and cumulatively adding the processed difference data in the first direction. In these cases, image data that represents regions at which ringing components are likely to be generated can be extracted, by setting the threshold value. In addition, drastic changes in pixel values of the image data that represents these regions can be reduced, by the process that reduces the absolute values of the difference data. Thereby, the generation of ringing components during processing to extract the striped blur components can be more positively suppressed. Accordingly, inclusion of the ringing components in an image, from which striped blur components have been removed, is suppressed, therefore the quality of the image can be improved. At the same time, loss of linear image information components associated with removal of striped blur components can also be suppressed.

In the case that the preprocess is that which reduces drastic changes in pixel values of the image data set in the second direction, the preprocess may comprise the steps of:

obtaining difference data that represents the difference between pixel data, which are adjacent in the second direction;

executing a process that decreases the absolute value of the difference data having values that exceed a predetermined threshold value; and cumulatively adding the processed difference data in the second direction.

Alternatively, the preprocess may comprise the steps of:

obtaining difference data that represents the difference between pixel data, which are adjacent in the second direction;

executing a filtering process on the difference data in the second direction;

executing a process that decreases the absolute value of the filter processed difference data having values that exceed a predetermined threshold value; and cumulatively adding the processed difference data in the second direction. In these cases as well, the inclusion of the ringing components in an image, from which striped blur components have been removed, is suppressed in the same manner as above. Therefore, the quality of the image can be improved. At the same time, loss of linear image information components associated with removal of striped blur components can also be suppressed.

Note that the striped blur components are lost or become inaccurate in regions of the image represented by the image data, to which the process for reducing absolute values has been executed. Therefore, the striped blur components cannot be accurately removed from these regions. However, these regions are those in which pixel values change drastically. Therefore, the deterioration in image quality caused by the striped blur components that remain in these regions is extremely small, and these remaining noise components do not detract from the improvement in quality of the image.

According to the third image processing method, the second image processing apparatus, and the second image processing program of the present invention, an image data set that represents an image borne by an image carrier, obtained by relatively moving the image carrier in a sub scanning direction with respect to a photoelectric conversion element array that comprises a great number of photoreceptors arranged in a main scanning direction, which intersects with the sub scanning direction, while detecting light emitted by the image carrier with the photoreceptors, is processed by:

executing a filter process on the image data set, to extract a line noise component that extends in the sub scanning direction and/or the main scanning direction within the image represented by the image data set;

executing a process that reduces the absolute values of pixel data of image data that represents the line noise component as a whole; and subtracting the processed image data that represents the line noise component from the image data set, to remove the line noise component from the image. Accordingly, the inclusion of the ringing components in an image, from which striped blur components have been removed, is suppressed. At the same time, loss of linear image information components associated with removal of striped blur components can also be suppressed. Therefore, the quality of the image can be improved.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

BRIEF DESCRIPTION OF THE DRAWINGS

FIGS. 3A1, 3A2, 3B1, 3B2, 3C1, and 3C2 illustrate the manner in which striped blur components are extracted without executing the preprocess, wherein: FIG. 3A1 shows an original image; FIG. 3A2 is a graph that illustrates the values of image data that represent the original image; FIG. 3B1 shows an image represented by the image data that represents the original image, to which a filter process has been executed; FIG. 3B2 is a graph that illustrates the values of image data that represent the image of FIG. 3B1; FIG. 3C1 shows the striped blur components, which have been extracted from the original image; and FIG. 3C2 is a graph that illustrates the values of image data that represent the striped blur components.

FIG. 4A is a graph that illustrates the values of image data that represent the original image; FIG. 4B is a graph that illustrates the values of difference data of the image data; FIG. 4C is a graph that illustrates the values of the running averages of the difference data; and FIG. 4D is a graph that illustrates the values of image data, in which the values of the difference data corresponding to running averages that exceed a predetermined threshold value are converted to zero.

FIGS. 6A1, 6A2, 6B1, 6B2, 6C1, and 6C2 illustrate the manner in which striped blur components are extracted by the filter process, wherein: FIG. 6A1 shows an image represented by image data on which the preprocess has been executed; FIG. 6A2 is a graph that illustrates the values of image data that represent the preprocessed image; FIG. 6B1 shows the preprocessed image represented by image data on which a filter process has been executed; FIG. 6B2 is a graph that illustrates the values of image data that represent the image of FIG. 6B1; FIG. 6C1 shows the striped blur components, which have been extracted; and FIG. 3C2 is a graph that illustrates the values of image data that represent the striped blur components.

FIGS. 7A1, 7A2, 7B1, 7B2, 7C1, and 7C2 illustrate the manner in which striped blur components are removed from an image, wherein: FIG. 7A1 shows the original image; FIG. 7A2 is a graph that illustrates the values of image data that represent the original image; FIG. 7B1 shows the extracted striped blur components; FIG. 7B2 is a graph that illustrates the values of image data that represent the striped blur components; FIG. 7C1 show the original image, from which the striped blur components have been removed; and FIG. 7C2 is a graph that illustrates the values of image data that represent the image of FIG. 7C1.

FIGS. 8A and 8B show two dimensional spectra of images, wherein: FIG. 8A shows a two dimensional spectrum of the original image; and FIG. 8B shows a two dimensional spectrum of the image from which striped blur components have been removed.

FIGS. 10A, 10B, 10C, and 10D illustrate a technique in which striped blur components are removed from an image without executing a preprocess, wherein: FIG. 10A is a graph that illustrates the values of pixel data of an original image; FIG. 10B is a graph that illustrates the values of pixel data of image data that represent striped blur components; FIG. 10C is a graph that illustrates the values of pixel data of image data that represent striped blur components, in which the absolute values have been reduced; and FIG. 10D is a graph that illustrates the values of pixel data of image data, from which the striped blur components have been removed.

DESCRIPTION OF THE PREFERRED EMBODIMENTS

Figure 1:
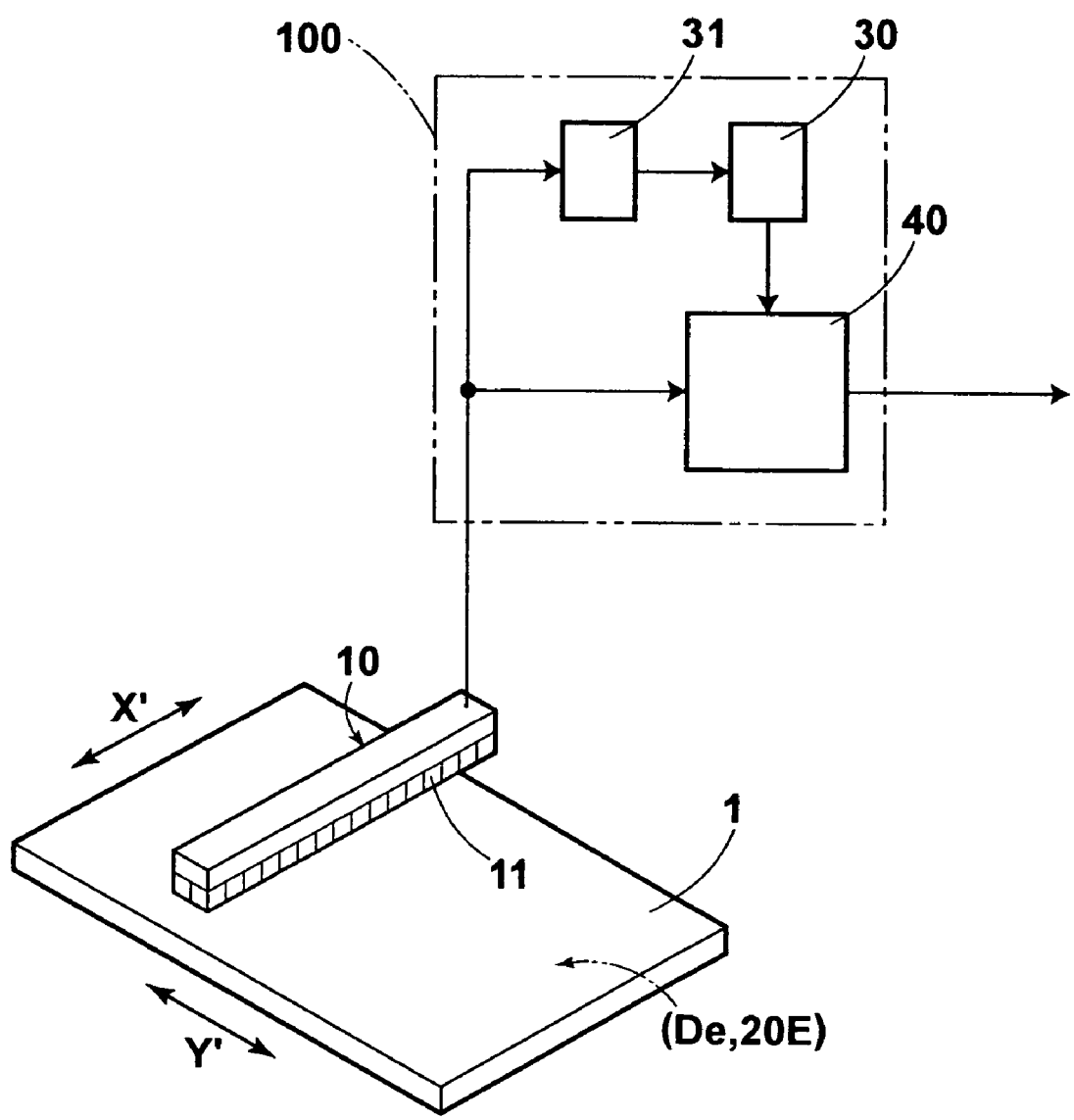
FIG. 1 is a schematic diagram that illustrates the configuration of an image processing apparatus according to an embodiment of the present invention.
Figure 2A:
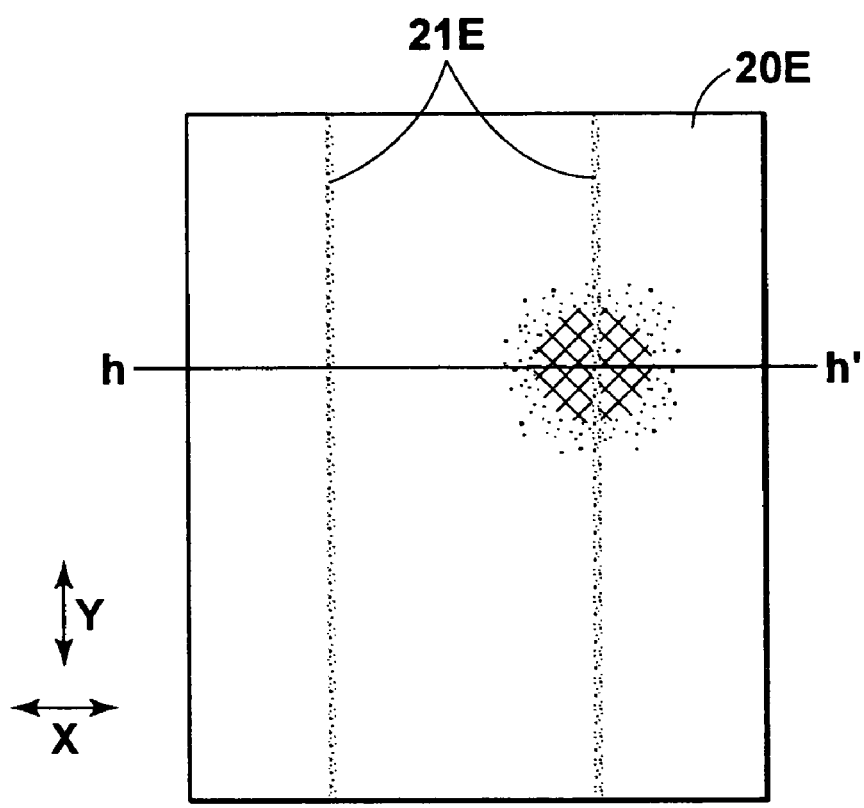
FIG. 2A illustrates an image represented by an image data set, which has been detected and obtained by line sensors.
Figure 2B:
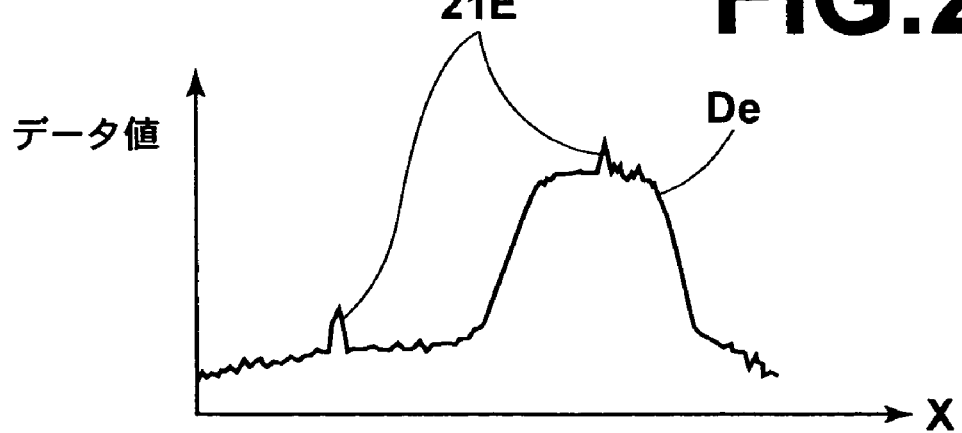
FIG. 2B is a graph that illustrates the pixel values of the image data set, which has been detected and obtained by line sensors.

Hereinafter, embodiments of the present invention will be described with reference to the attached drawings. FIG. 1 is a schematic diagram that illustrates the configuration of an image processing apparatus 100 according to an embodiment of the present invention. FIG. 2A illustrates an image represented by an image data set, which has been detected and obtained by line sensors. FIG. 2B is a graph that illustrates the pixel values of the image data set, which has been detected and obtained by line sensors.

The image processing apparatus 100 of the present embodiment illustrated in FIG. 1 is that which executes image processes on an image data set that represents an original image 20E borne by an original 1, which is an image carrier, obtained by relatively moving the original 1 in a sub scanning direction (indicated by arrow Y' in FIG. 1) with respect to a line sensor 10, which is a photoelectric conversion element array, that comprises a great number of photoreceptors arranged in a main scanning direction (indicated by arrow X' in FIG. 1), which intersects with the sub scanning direction, while the line sensor 10 detects light emitted by the original 1 when illuminated. The image processing apparatus 100 comprises a line noise extracting means 30; a preprocessing means 31; and a subtracting means 40. The line noise extracting means 30 executes a filter process on the image data set that represents the original image 20E to extract image data that represent line noise components (hereinafter, referred to as "striped blur components 21E") that extend in the sub scanning direction (indicated by arrow Y in FIG. 2) within the original image 20E. The preprocessing means 31 executes a preprocess that reduces drastic changes in pixel values of the image data set that represents the original image 20E, in a first direction (indicated by arrow X in FIG. 2) perpendicular to the sub scanning direction, prior to the filter process executed by the line noise extracting means 30. The subtracting means 40 subtracts the image data that represent the striped blur components 21E from the image data set that represents the original image 20E. The sub scanning direction of the original image 20E (indicated by arrow Y in FIG. 2) corresponds to the sub scanning direction (indicated by arrow Y' in FIG. 1), in which the original 1 is relatively moved with respect to the line sensor 10.

The line noise extracting means 30 is also capable of executing a filter process on the image data set that represents the original image 20E to extract striped blur components that extend in the main scanning direction within the original image 20E. The preprocessing means 31 is also capable of executing a preprocess that reduces drastic changes in pixel values of the image data set that represents the original image 20E, in a second direction perpendicular to the main scanning direction, prior to the filter process executed by the line noise extracting means 30. The main scanning direction of the original image 20E corresponds to the main scanning direction (indicated by arrow X' in FIG. 1), in which the great number of photoreceptors of the line sensor 10 are arranged.

Note that the striped blur components 21E are mainly generated due to differences in the properties of the individual photoreceptors that constitute the line sensor 10. In actuality, a great number of striped blurs of various sizes that extend in the sub scanning direction of the original image 20E may be generated. However, only two large striped blur components 21E of the original image 20E are illustrated in FIG. 2A. The pixel values illustrated in the graph of FIG. 2B represent pixel values of image data which are positioned on a line h-h', which extends in the first direction of the original image 20E.

In addition, the image data set that represents the original image 20E also includes a region in which the pixel values change drastically in the first direction.

The preprocessing means 31 obtains difference data that represents differences among pixel data De, which are adjacent in the first direction, of the image data set that represents the original image 20E. Next, the preprocessing means 31 executes a process to reduce the absolute values of the difference data that exceeds a predetermined threshold value, then cumulatively adds the processed difference data in the first direction. Alternatively, the preprocessing means 31 obtains difference data that represents differences among pixel data De, which are adjacent in the first direction, of the image data set that represents the original image 20E. Next, the preprocessing means 31 obtains running averages of the difference data in the first direction. Thereafter, the preprocessing means 31 executes a process to reduce the absolute values of the difference data that correspond to pixel data, the values of which the running average exceeds a predetermined threshold value, then cumulatively adds the processed difference data in the first direction. In addition, the preprocessing means 31 obtains difference data that represents differences among pixel data De, which are adjacent in the second direction, of the image data set that represents the original image 20E. Next, the preprocessing means 31 executes a process to reduce the absolute values of the difference data that exceeds a predetermined threshold value, then cumulatively adds the processed difference data in the second direction. Alternatively, the preprocessing means 31 obtains difference data that represents differences among pixel data De, which are adjacent in the second direction, of the image data set that represents the original image 20E. Next, the preprocessing means 31 obtains running averages of the difference data in the second direction. Thereafter, the preprocessing means 31 executes a process to reduce the absolute values of the difference data that correspond to pixel data, the values of which the running average exceeds a predetermined threshold value, then cumulatively adds the processed difference data in the second direction. These processes will be described in detail later.

Note that "the difference data that correspond to pixel data, of which the running average exceeds a predetermined threshold value", and the corresponding pixel data represent the same positions in the original image 20E. In addition, the obtainment of the running averages is an example of a filtering process.

Next, the operation of the image processing apparatus will be described.

Hereinafter, the operation of the preprocessing means 31 that suppresses the generation of ringing components during the process to extract striped blur components will be described.

First, a case will be described wherein striped blur components 21E that extend in the sub scanning direction of an original image 20E are extracted without executing the above preprocess, as a comparative example. FIGS. 3A1, 3A2, 3B1, 3B2, 3C1, and 3C2 illustrate the manner in which striped blur components are extracted without executing the preprocess. FIG. 3A1 shows an original image 20E, and FIG. 3A2 is a graph that illustrates the values of image data that represent the original image 20E. FIG. 3B1 shows an image 20F represented by the image data that represents the original image 20E, to which a filter process has been executed, and FIG. 3B2 is a graph that illustrates the values of image data that represent the image of FIG. 3B1. FIG. 3C1 shows the striped blur components, which have been extracted from the original image 20E, and FIG. 3C2 is a graph that illustrates the values of image data that represent the striped blur components. Note that the above graphs that illustrate the values of image data illustrate the values of image data positioned along the line h-h', which extends in the first direction of each of the images.

Image data Df that represents the image 20F is obtained by executing a low pass filter process in the first direction on the image data De that represents the original image 20E. The image data Df comprises low frequency components. The image 20F is a blurred and spread out image. A region Rf within the image 20F corresponds to a region Re within the image 20e, where pixel values of the image data De change drastically in the first direction. Pixel values of the image data Df in the vicinity of the region Rf change greatly from the pixel values of the image data De in the corresponding region (refer to FIGS. 3B1 and 3B2). Image data Dg, comprising high frequency components, is obtained by subtracting the image data Df from the image data De, which represent the original image 20E. An image 20G, represented by the image data Dg, includes rippled portions (ringing components) in the first direction in the vicinity of a region Rg, which corresponds to the region Re, in addition to striped blur components 21G (refer to FIGS. 3C1 and 3C2). The ringing components represent the difference in pixel values of the image data De and the image data Df in the vicinity of the region Rg.

Figure 5A:
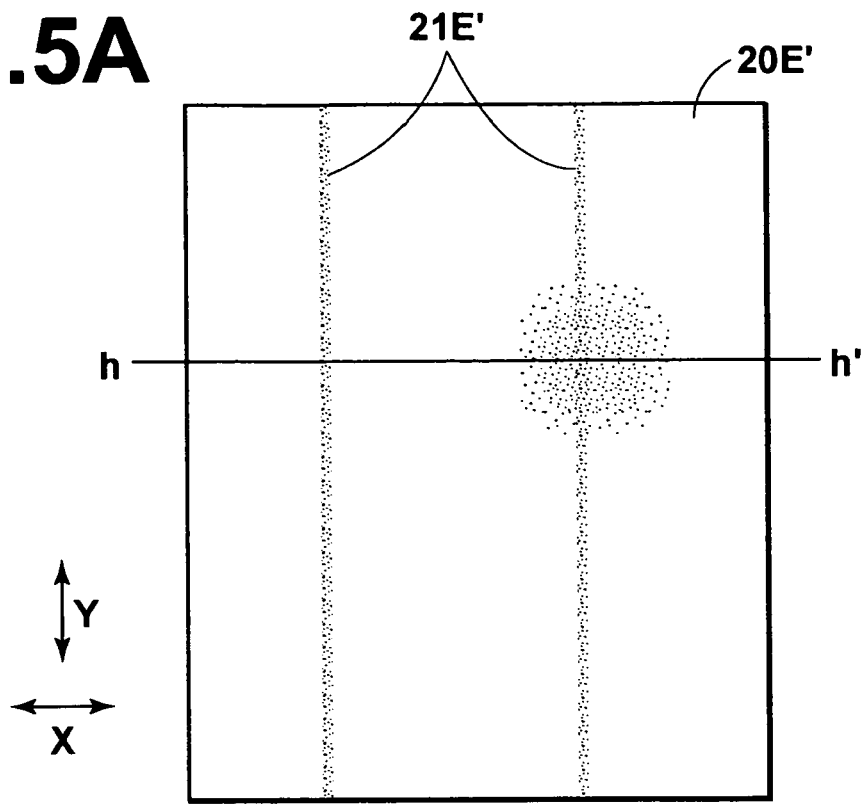
FIG. 5A shows an image represented by cumulatively added image data.
Figure 5B:
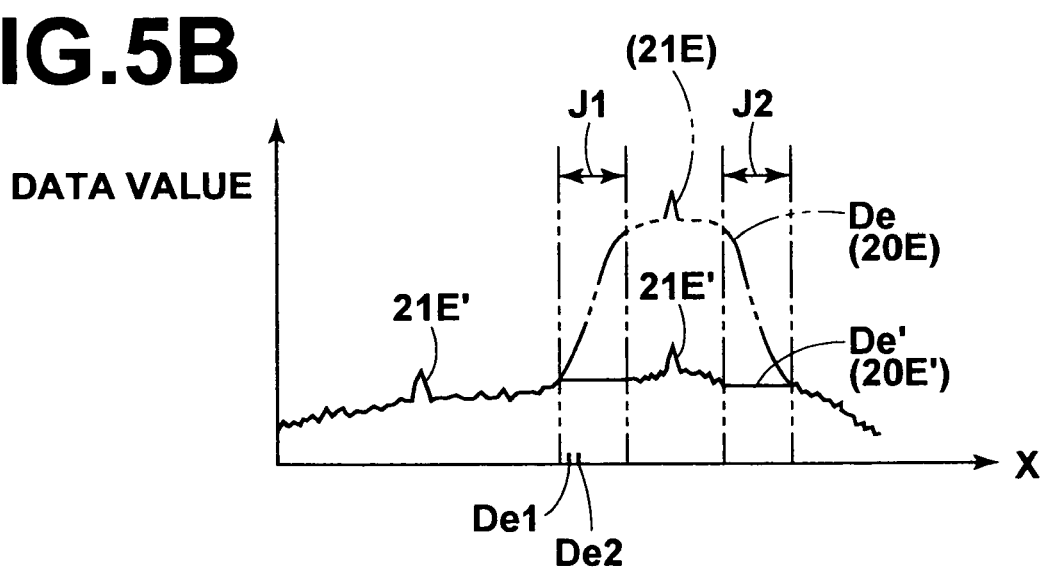
FIG. 5B is a graph that illustrates the values of the cumulatively added image data.

Image data that represent striped blur components can be extracted from the original image 20E without generating the ringing components, by the preprocessing means 31 executing the preprocess, prior to the administration of the filter process. Hereinafter, a case will be described in which image data that represent striped blur components are extracted after executing the preprocess. FIGS. 4A, 4B, 4C, and 4D illustrate the manner in which the preprocess is executed. FIG. 4A is a graph that illustrates the values of image data that represent the original image 20E. FIG. 4B is a graph that illustrates the values of difference data of the image data. FIG. 4C is a graph that illustrates the values of the running averages of the difference data. FIG. 4D is a graph that illustrates the values of image data, in which the values of the difference data corresponding to running averages that exceed a predetermined threshold value are converted to zero. FIGS. 5A and 5B show image data, in which the zero value difference data is cumulatively added. FIG. 5A shows an image represented by the cumulatively added image data, and FIG. 5B is a graph that illustrates the values of the cumulatively added image data.

The preprocess executed by the preprocessing means 31 comprises the following steps. First, the preprocessing means 31 obtains image data Se that represent the differences in pixel values among image data De, which are adjacent in the first direction of the original image 20E. Specifically, for example, consider a case of three pixel data values, De1, De2, and De3, which are adjacent in the first direction. A difference value U1, which is the value obtained when pixel data De1 is subtracted from pixel data De2, is obtained. The difference value U1 is designated as the value of pixel data Se1, which is positioned at a position corresponding to that represented by the pixel data De1 within the image 20E. In addition, a difference value U2, which is the value obtained when pixel data De2 is subtracted from pixel data De3, is obtained. The difference value U2 is designated as the value of pixel data Se2, which is positioned at a position corresponding to that represented by the pixel data De2 within the image 20E. In this manner, an image data set Se, which represents the entirety of the difference data, is obtained.

Next, the preprocessing means 31 obtains image data He, which represents running averages in the first direction, of the pixel values of the image data Se. Specifically, the values of three pixel data Se1, Se2, and Se3 are averaged, to obtain a value V2. The value V2 is designated as the value of pixel data He2, which is positioned at a position corresponding to that represented by the pixel data Se2 within the image 20E. In this manner, an image data set He, which represents the entirety of the running averages, is obtained.

Thereafter, the preprocessing means 31 obtains image data Te. The image data Te is obtained by executing a process that reduces the absolute values of the image data He that exceed a threshold value ±Kh. Specifically, for example, the values of pixel data He1, He2, and He3, which are positive values that exceed the threshold value +Kh, are converted to zero. The image data Te is obtained in this manner. That is, the image data Te is that in which values of pixel data corresponding to regions J1 and J2, where pixel values of the image data De change drastically in the first direction.

Note that the threshold value ±Kh is determined to enable separation of image data that represent the regions J1 and J2, where pixel values change drastically and ringing components are conspicuously generated during extraction of the striped blur components, from image data that represent other regions. In addition, the determination of the threshold value also separates striped blur components from linear image information components.

Next, image data De' is obtained, by cumulatively adding the image data Te in the first direction. Specifically, for example, the value of pixel data De'1 is derived by sequentially adding (cumulatively adding) values of the image data Te from one end in the first direction (the side of h, on the line h-h'). The value of pixel data Te1 is added to the value of pixel data De'1, to obtain the value of pixel data De'2, then the value of pixel data Te2 is added to the value of pixel data De'2 to obtain the value of pixel data De'3. Calculations are repeated in this manner to obtain an image data set De', that represents the entirety of the cumulatively added image data, is obtained.

The image data set De' obtained in this manner corresponds to the image data De, with the drastic changes in pixel values in the first direction of the original image 20E being reduced. FIG. 5A shows an image 20E', which is represented by the image data set De'. Regions J1 and J2 within the graph of FIG. 5B are those in which the drastic changes in the pixel values of the image data De have been reduced.

Note that it is possible to reduce drastic changes in the pixel values of image data De in the first direction even in the case that the running average process is not executed in the preprocess. That is, a threshold ±Ks may be determined with respect to the image data Se that represent the difference among adjacent pixels of the image data De. Then, a process may be executed to reduce the absolute values of image data Se having values that exceed the threshold value ±Ks. Finally, an image data set, in which drastic changes in pixel values in the first direction of the image are reduced, may be generated by cumulatively adding the processed image data Se in the same manner as above.

Note that the capabilities of separating the regions at which ringing components are conspicuously generated from other regions differ between the case in which a threshold value is determined for the image data Se and the case in which a threshold value is determined for the image data He. Generally, components represented by image data have more low frequency components than striped blur components (high frequency components). The running averaging process attenuates high frequency components, therefore the capability of separating the striped blur components from the image data is improved.

Finally, a filter process (for example, a low pass filter process) is executed in the first direction on the image data set De', to extract striped blur components 21E'. FIGS. 6A1, 6A2, 6B1, 6B2, 6C1, and 6C2 illustrate the manner in which striped blur components are extracted by the filter process. FIG. 6A1 shows an image represented by image data on which the preprocess has been executed, and FIG. 6A2 is a graph that illustrates the values of image data that represent the preprocessed image. FIG. 6B1 shows the preprocessed image represented by image data on which a filter process has been executed, and FIG. 6B2 is a graph that illustrates the values of image data that represent the image of FIG. 6B1. FIG. 6C1 shows the striped blur components, which have been extracted, and FIG. 3C2 is a graph that illustrates the values of image data that represent the striped blur components. Note that the above graphs that illustrate the values of image data illustrate the values of image data positioned along the line h-h', which extends in the first direction of each of the images.

The line noise extracting means 30 executes a low pass filter process in the first direction (indicated by arrow X in FIG. 6A1) on the image data set De' to obtain an image data set Db that represents an image 20B comprising low frequency components. Then, the line noise extracting means 30 subtracts the image data set Db from the image data set De', to obtain an image data set Dc that represents an image 20C comprising high frequency components. The image 20C is an image that shows the striped blur components 21E'. Note that the process to extract image data that represent the striped blur components may further comprise the step of executing a low pass filter process in the sub scanning direction following the low pass filter process in the first direction, to obtain an image data set Db' that represents an image 20B'.

As described above, the image data that represent the striped blur components is extracted from the image data set De', in which drastic changes of pixel values in the first direction have been reduced by the pre process. Thereby, the generation of ringing components is suppressed during extraction of the image data that represent the striped blur components, compared to the comparative example, in which the filter process is executed on the image data set De, which has not been preprocessed.

Next, the striped blur components are removed by the subtracting means 40. FIGS. 7A1, 7A2, 7B1, 7B2, 7C1, and 7C2 illustrate the manner in which striped blur components are removed from an image. FIG. 7A1 shows the original image, and FIG. 7A2 is a graph that illustrates the values of image data that represent the original image. FIG. 7B1 shows the extracted striped blur components, and FIG. 7B2 is a graph that illustrates the values of image data that represent the striped blur components. FIG. 7C1 show the original image, from which the striped blur components have been removed, and FIG. 7C2 is a graph that illustrates the values of image data that represent the image of FIG. 7C1. Note that the above graphs that illustrate the values of image data illustrate the values of image data positioned along the line h-h', which extends in the first direction of each of the images.

The subtracting means 40 subtracts the striped blur components 21E from the original image 20E. That is, the image data set Dc, which represents the image 20C comprising high frequency components, is subtracted from the image data set De, which represents the original image De. Thereby, an image data set Dd that represents an image 20D, which is the original image 20E having the striped blur components 21E removed therefrom, is obtained. By the processes described above, loss of linear image information components associated with removal of striped blur components, can be suppressed.

At this time, if the values of the pixels of the image data set Dc that represents the striped blur components 21E are subtracted from the image data set De as is, high frequency components, which include the striped blur components 21E, are subtracted at more than necessary levels from the image data set De. This may lead to differences in the quality of the original image 20E and the image 20D, from which the striped blur components 21E have been removed. Accordingly, it is desirable to change the magnitude of the values of each of the pixel data of the image data set Dc, by multiplying the values with a uniform coefficient, then subtract the image data set that represents the striped blur components, which has been generated in this manner, from the image data set De, to remove the striped blur components 21E from the original image 20E. By employing this method, the difference in quality between the original image 20E and the image 20D can be reduced.

Figure 8A:
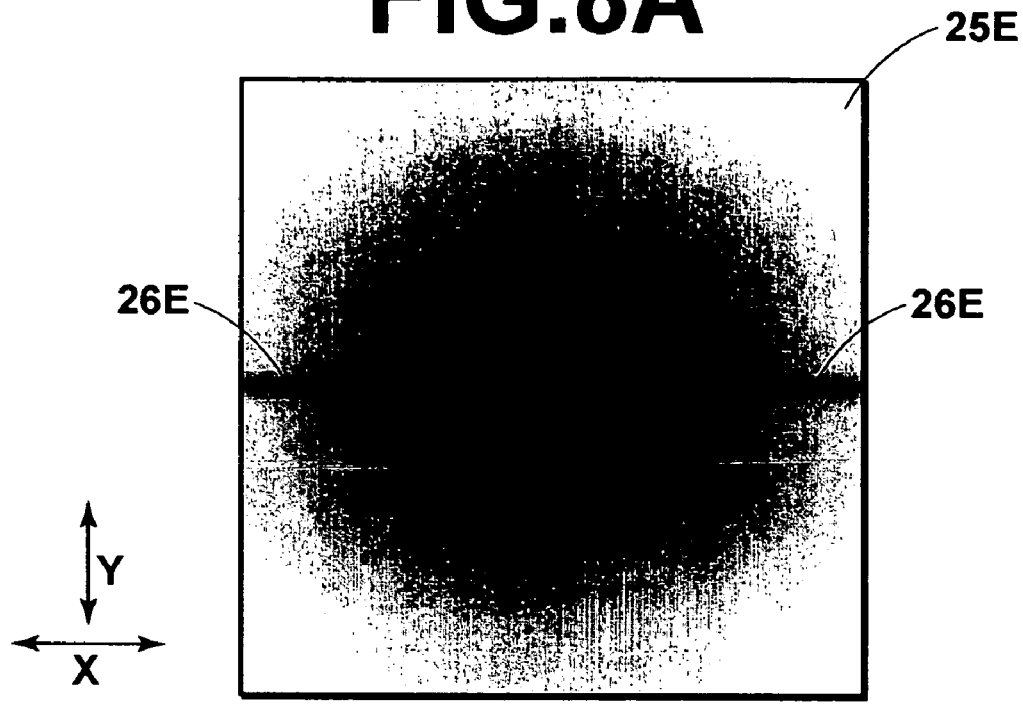
Figure 8B:
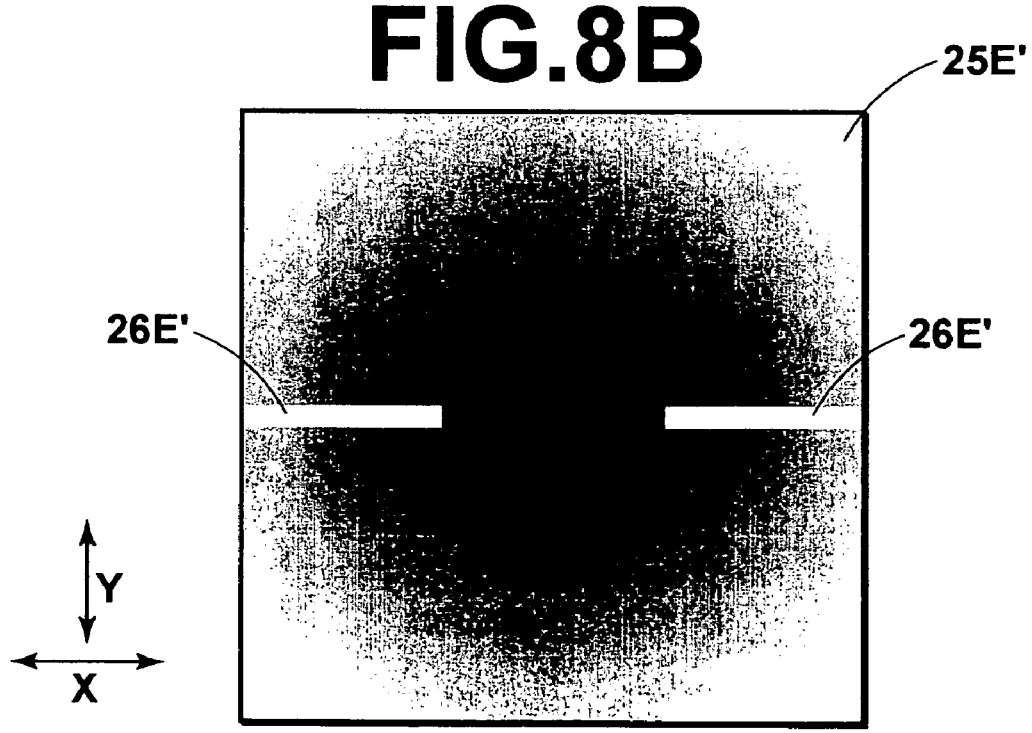

An explanation of the difference in quality with respect to a Fourier space is as follows. FIGS. 8A and 8B show two dimensional spectra of images. FIG. 8A shows a two dimensional spectrum of the original image, and FIG. 8B shows a two dimensional spectrum of the image from which striped blur components have been removed.

As illustrated in FIG. 8A, a two dimensional spectrum 25E of the original image 20E, which includes the striped blur components 21E, is obtained by two dimensional Fourier transform. The striped blur components 21E appear in regions 26, which represent low frequency components in the sub scanning direction (indicated by arrow Y in FIG. 8A), and high frequency components in the first direction (indicated by arrow X in FIG. 8A). Consider a case in which the values of the pixels of the image data set Dc that represents the striped blur components 21E are subtracted from the image data set De as is. In this case, spectrum components that include the striped blur components are substantially removed from regions 26E' of a two dimensional spectrum 25E', which is obtained by Fourier transform of the image from which the striped blur components have been removed. The regions 26E' correspond to the regions 26E of the two dimensional spectrum 25E. That is, specific spectrum components corresponding to the regions 26E' are substantially absent in the image from which the striped blur component shave been removed. Therefore, differences may be present in the quality of the image 20D and the original image 20E.

Figure 9:
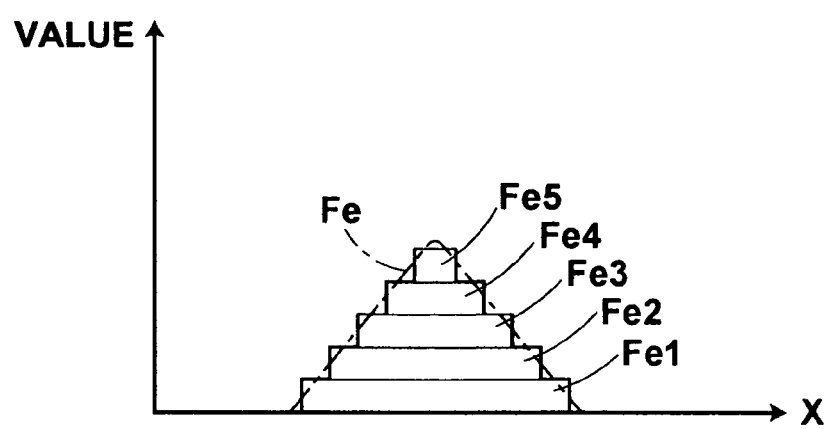
FIG. 9 is a graph that illustrates a quantized filter for performing weighted running averaging.
Figure 10A:
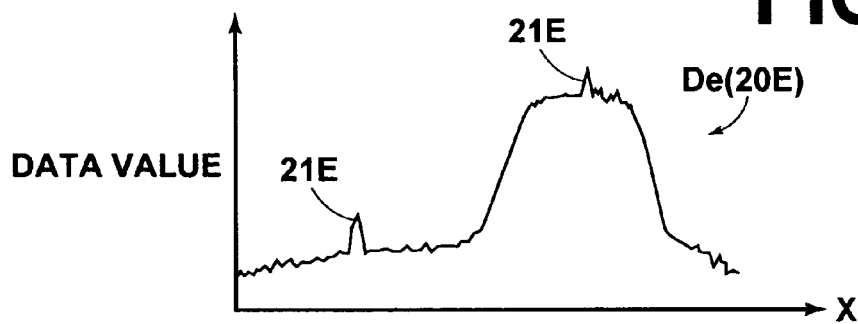
Figure 10B:
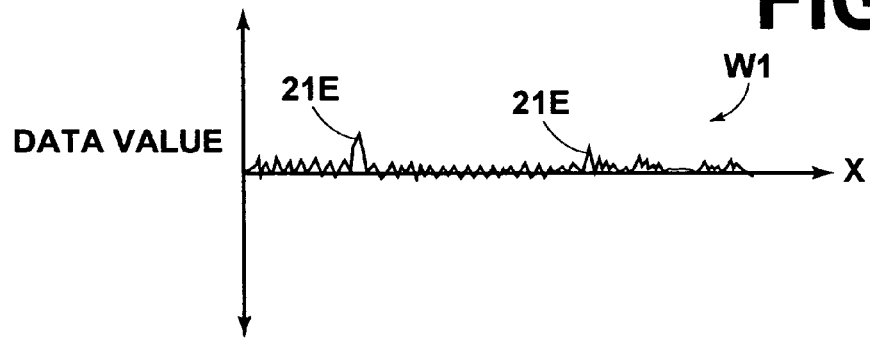
Figure 10C:
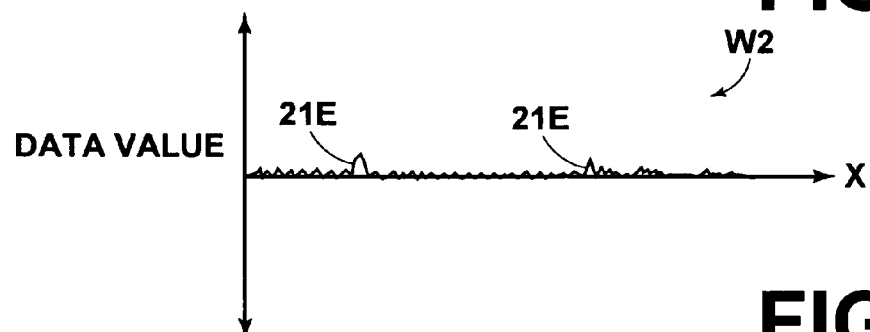
Figure 10D:
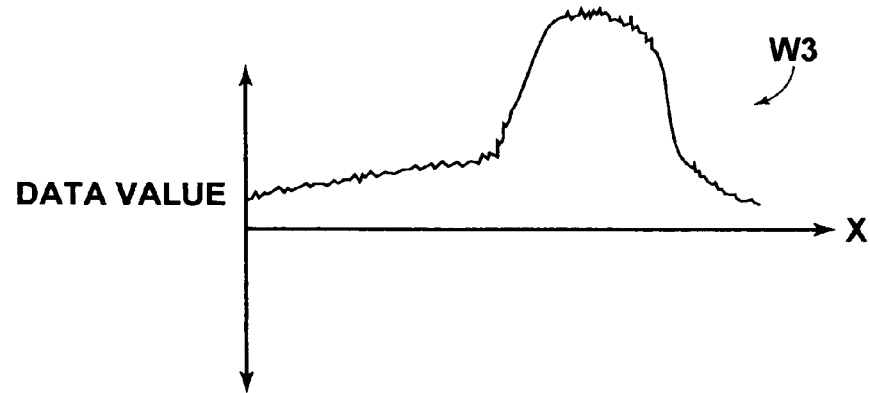
Figure 11:
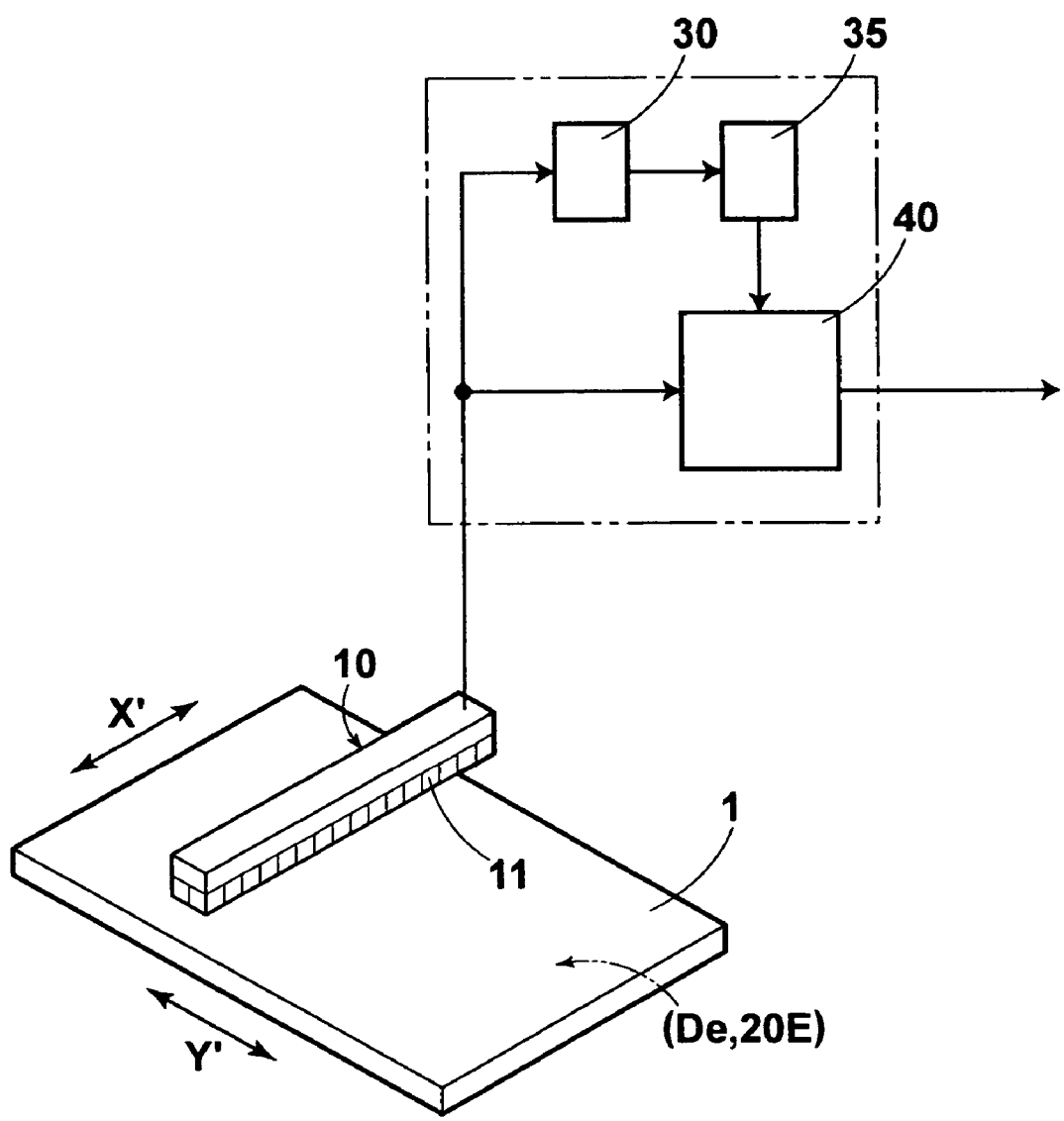
FIG. 11 is a perspective view that illustrates the schematic structure of an image processing apparatus that removes striped blur components from an image without executing a preprocess.

In addition, the filter processes executed to the image data sets are performed at high speed. Therefore, a filter Fe is approximated by filters Fe1, Fe2, Fe3, Fe4, and Fe5, each having different ranges for running averages, as shown in FIG. 9. The image data sets are passed through the filters Fe1, Fe2, Fe3, Fe4, and Fe5 as individual processes during the filter process. Thereby, a filter process equivalent to passing the image data set through the filter Fe can be realized with a smaller amount of calculation. That is, multiplication processes during passing of the image data set through the filter Fe are substituted by addition processes during passing of the image data set through the filters Fe1, Fe2, Fe3, Fe4, and Fe5, thereby reducing the total amount of calculation.

Note that the preprocess may be executed after the image data set that represents the original image is passed through a filter or the like, to reduce high or low frequency components in the sub scanning direction, in which the striped blur components extend.

In addition, the process to extract the striped blur components may be that in which preprocessed image data that includes the striped blur components is passed through a high pass filter. That is, a filter may be employed that extracts high frequency components in the first direction.

Further, the changing of the magnitude of the values of each of the pixel data of the image data that represent the striped components during removal of the striped components from the original image by the subtracting means may be realized with conversion tables or conversion functions.

Note that in the embodiment described above, a case was described in which the striped blur components extend in the sub scanning direction of the image. However, it goes without saying that the present invention is applicable to cases in which striped blur components extend in the main scanning direction of an image, or cases in which striped blur components extend in both the main and sub scanning directions of an image. The generation of ringing components is suppressed while extracting image data that represent the striped blur components in these cases as well, thereby suppressing the inclusion of ringing components in a processed image.

Further, the technique of extracting image data that represent striped blur components while suppressing the generation of the ringing components is applicable to striped blur components that extend in directions other than the main and sub directions as well.

Note that the image carrier (original) may be a radiation image conversion panel for recording radiation images, formed by layering a stimulable phosphor layer on a substrate (refer to Unexamined Japanese Patent Publication No. 2001-13599, for example). In this case, image data that represent the radiation images are obtained by detecting stimulated phosphorescence with a line sensor. The stimulated phosphorescence is emitted from the radiation image conversion panel by being irradiated with excitation light. Here, the line sensor may be provided in a staggered manner.

Note that a technique such as that described below may be employed to remove striped blur components from the image data set De that represents the original image 20E without executing the preprocess thereon.

As illustrated in FIGS. 10A, 10B, 10C, 10D, and FIG. 11, the line noise extracting means 30 executes a filter process on an image data set De (refer to FIG. 10A) that represents the original image 20E, which includes the striped blur components 21E, to extract predetermined high frequency components therefrom. Thereby, image data W1 (refer to FIG. 10B) that represent the striped blur components is extracted.

If the values of the pixels of the image data W1 that represent the striped blur components 21E are subtracted from the image data set De as is, high frequency components, which include ringing components and the striped blur components 21E, are subtracted at more than necessary levels from the image data set De. This may lead to differences in the quality of the original image 20E and the image from which the striped blur components 21E have been removed. Therefore, a data converting means 35 obtains image data W2 (refer to FIG. 10C), in which the absolute values of each of the pixel data of the image data W1 are reduced by multiplying the values with a uniform coefficient, for example.

Thereafter, the subtracting means 40 subtracts the image data W2, obtained in the manner described above, from the image data set De, to obtain image data W3 (refer to FIG. 10D), which represents the original image 20E having the striped blur components 21E removed therefrom. By employing this method, the oscillation width of the ringing components and the difference in quality between the images can be reduced. At the same time, the loss of linear image information components, associated with the removal of striped blur components, can also be reduced.

What is claimed is:

1. An image processing method, comprising: a processor performing the steps of:

executing a filter process on an image data set, to extract a line noise component that extends in a sub scanning direction and/or a main scanning direction within an image represented by the image data set; and subtracting image data that represents the line noise component from the image data set, to remove the line noise component from the image; wherein: a preprocess, which reduces drastic changes in pixel values of the image data set in a first direction perpendicular to the sub scanning direction or a second direction perpendicular to the main scanning direction, is executed on the image data set prior to the filter process, wherein in the case that the preprocess is that which reduces drastic changes in pixel values of the image data set in the first direction, the preprocess comprises the steps of:

obtaining difference data that represents the difference between pixel data, which are adjacent in the first direction;

executing a process that decreases the absolute value of the difference data having values that exceed a predetermined threshold value; and cumulatively adding the processed difference data in the first direction, wherein in the case that the preprocess is that which reduces drastic changes in pixel values of the image data set in the second direction, the preprocess comprises the steps of:

obtaining difference data that represents the difference between pixel data, which are adjacent in the second direction;

executing a processes that decreases the absolute value of the difference data having values that exceed a predetermined threshold value; and cumulatively adding the processed difference data in the second direction.

2. An image processing method as defined in claim 1, wherein:

in the case that the preprocess is that which reduces drastic changes in pixel values of the image data set in the second direction, the preprocess comprises the steps of:

obtaining difference data that represents the difference between pixel data, which are adjacent in the second direction;

executing a filtering process on the difference data in the second direction;

executing a process that decreases the absolute value of the filter processed difference data having values that exceed a predetermined threshold value; and cumulatively adding the processed difference data in the second direction.

3. The image processing method of claim 1, wherein the method is performed by an apparatus for obtaining image data.

4. The image processing method of claim 1, further comprising displaying the image data set after the image data that represents the line noise component has been subtracted.

5. The image processing method of claim 1, wherein:
in the case that the preprocess is that which reduces drastic changes in pixel values of the image data set in the first direction, the preprocess comprises the steps of:
obtaining difference data that represents the difference between pixel data, which are adjacent in the first direction;
executing a filtering process on the difference data in the first direction;
executing a process that decreases the absolute value of the filter processed difference data having values that exceed a predetermined threshold value; and
cumulatively adding the processed difference data in the first direction.

* * * * *